United States Patent [19]
Katsube et al.

[11] 3,922,266
[45] Nov. 25, 1975

[54] ARYL KETONES AND PRODUCTION THEREOF

[75] Inventors: Junki Katsube, Toyonaka; Masaru Nakao, Osaka; Kikuo Sasajima, Toyonaka; Isamu Maruyama; Masaharu Takayama, both of Minoo; Keiichi Ono, Osaka; Shiegenari Katayama, Takarazuka; Yoshihiro Tanaka, Takarazuka; Shigeho Inaba, Takarazuka; Hisao Yamamoto, Nishinomiya, all of Japan

[73] Assignee: Sumitomo Chemical Company, Limited, Japan

[22] Filed: Dec. 18, 1972

[21] Appl. No.: 316,026

[30] Foreign Application Priority Data
Sept. 22, 1972 Japan............ 47-95720
July 12, 1972 Japan............ 47-70265
July 12, 1972 Japan............ 47-70266
June 28, 1972 Japan............ 47-65208

[52] U.S. Cl. ............ 260/240 J; 424/250; 424/267; 260/243 R; 260/247.1 R; 260/247.1 L; 260/247.7 A; 260/268 MK; 260/293.66; 260/293.7; 260/293.71; 260/618 E
[51] Int. Cl.² ............ C09B 23/00; C07D 295/00
[58] Field of Search ............ 260/240 J, 268 MK

[56] References Cited
UNITED STATES PATENTS
2,997,472  8/1961  Janssen.................. 260/268 PH
2,997,474  8/1961  Janssen.................. 260/268 PH
3,007,928  11/1961 Parcell.................. 260/268 PH
3,637,704  1/1972  Umemoto et al......... 260/268 R
3,753,983  8/1973  Raabe et al............ 260/240 J OTHER PUBLICATIONS
Wagner-Zook, Synthetic Organic Chemistry, pp. 323 to 324, John Wiley and Sons Inc., (1953).

*Primary Examiner*—John D. Randolph
*Attorney, Agent, or Firm*—Craig & Antonelli

[57] ABSTRACT
A process for preparing aryl ketones of the formula:

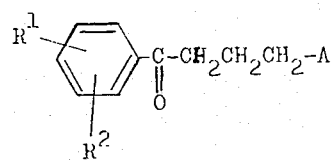

from a compound of the formula:

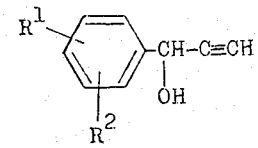

through a compound of the formula:

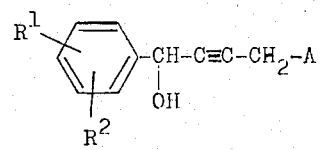

a compound of the formula:

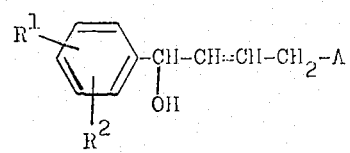

and a compound of the formula:

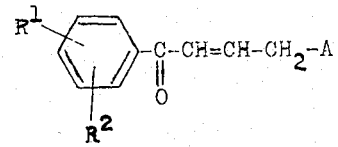

the said aryl ketones being [I] being useful as central nervous system depressants and the intermediary compounds [II], [III], and [IV] showing some pharmacological activities.

3 Claims, No Drawings

ARYL KETONES AND PRODUCTION THEREOF

The present invention relates to novel and advantageous processes for producing therapeutically active aryl ketones and to intermediates therein.

In an aspect of the present invention, it relates to processes for producing aryl ketones of the formula:

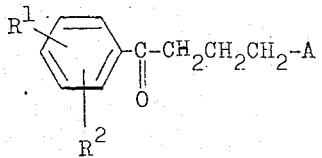  [I]

wherein $R^1$ is hydrogen, halogen, $C_1$-$C_4$ alkyl, $C_1$-$C_4$ alkoxy, $C_1$-$C_4$ alkylthio, sulfamoyl, $C_1$-$C_4$ alkylsulfonyl, $C_1$-$C_4$ alkanoylamino or trifluoromethyl, $R^2$ is hydrogen or halogen and A is an amino group of either one of the following formulae:

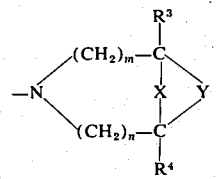

(wherein $R^3$ and $R^4$ are each hydrogen, $C_1$-$C_4$ alkyl or aryl, X and Y are each saturated or unsaturated alkylene, oxygen, sulfur, oxa-alkylene or thia-alkylene, a single bond or two hydrogen atoms which are non-bonded each other and m and n are each an integer of 0 to 4),

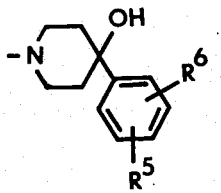

(wherein $R^5$ and $R^6$ are each hydrogen, halogen, $C_1$-$C_4$ alkyl or trifluoromethyl),

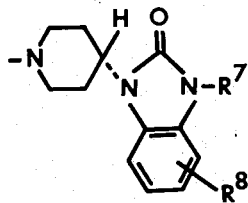

(wherein $R^7$ is hydrogen or $C_1$-$C_4$ alkanoyl and $R^8$ is hydrogen, halogen or $C_1$-$C_4$ alkyl),

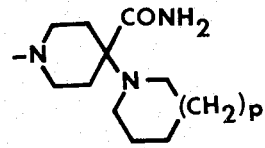

(wherein p is an integer of 0 or 1),

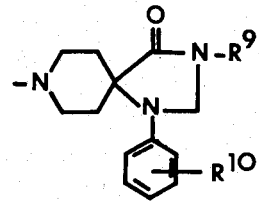

(wherein $R^9$ is hydrogen or $C_1$-$C_4$ alkanoyl and $R^{10}$ is hydrogen, halogen or $C_1$-$C_4$ alkyl), and

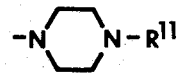

(wherein $R^{11}$ is $C_1$-$C_4$ alkyl, $C_2$-$C_4$ alkenyl, aralkyl and aryl), and their acid-addition salts.

In another aspect of the invention, it relates to olefinic aryl ketones of the formula:

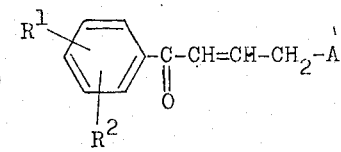  [II]

wherein $R^1$, $R^2$ and A are each as defined above and their acid-addition salts, and their preparation processes.

In another aspect of the invention, it relates to olefinic aryl alcohols of the formula:

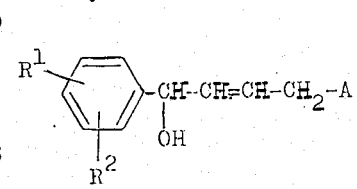  [III]

wherein $R^1$, $R^2$ and A are each as defined above and their acid-addition salts, and their preparation processes.

In a further aspect of the invention, it relates to acetylenic aryl alcohols of the formula:

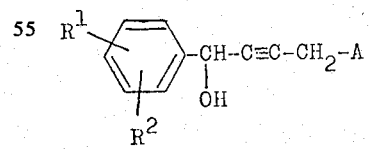  [IV]

wherein $R^1$, $R^2$ and A are each as defined above and their acid-addition salts, and their preparation processes.

In the significances as above mentioned, $C_1$-$C_4$ alkyl includes methyl, ethyl, n-propyl, isopropyl and t-butyl; $C_2$-$C_4$ alkenyl includes allyl and 2-isobutenyl; $C_1$-$C_4$ alkoxy includes methoxy, ethoxy, n-propoxy, isopropoxy and t-butoxy; $C_1$-$C_4$ alkylthio includes methylthio, ethylthio and n-propylthio; $C_1$-$C_4$ alkylsulfonyl includes methylsulfonyl, ethylsulfonyl and n-propylsulfonyl; $C_1$-$C_4$ alkanoyl includes formyl, acetyl, propionyl and butyryl; and $C_1$-$C_4$ alkanoylamino includes formylamino, acetylamino, propionylamino and butyrylamino. Alkylene may be methylene, ethylene, propylene, butylene or the like. Examples of aryl are phenyl and naphthyl, which may be substituted with $C_1$-$C_4$ alkyl, $C_1$-$C_4$ alkoxy, $C_1$-$C_4$ alkylthio, $C_1$-$C_4$ alkylsulfonyl, trifluoromethyl, halogen and the like. Examples of aralkyl are benzyl, phenethyl and benzhydryl, which may bear any substituent as exemplified above on the benzene ring. Halogen includes fluorine, chlorine, bromine and iodine.

The aryl ketones fallen within the formula [I] ant their pharmacological activities are known. For instance, British patent 881,893 discloses ω-(4-hydroxy-4-phenylpiperidino)-butyrophenones and their use as central nervous system depressants.

It has now been found that the olefinic aryl ketones of the formula [II] can be readily hydrogenated to the corresponding aryl ketones [I]. Thus, the olefinic aryl ketones [II] are quite advantageous intermediates in the production of the aryl ketones [I].

It has also been found that the olefinic aryl ketones [II], the olefinic aryl alcohols [III], and the acetylenic aryl alcohols [IV] exhibit a variety of beneficial properties and are per se useful as analgesic, anti-inflammatory, psychotropic, autonomotropic and/or anti-fungal agents. It is particularly notable that the olefinic aryl ketones [II] show an enhanced central nervous system depressive activity more than the corresponding aryl ketones [I].

Accordingly, an object of the present invention is to provide a novel process for producing the known therapeutically active aryl ketones [I]. Another object of this invention is to provide the new olefinic aryl ketones [II] having excellent pharmacological activities. A further object of the invention is to utilize the olefinic aryl ketones [II] as intermediates in the production of the aryl ketones [I]. A still further object of the invention is to provide the olefinic aryl alcohols [III] and the acetylenic aryl alcohols [IV], which are useful not only as intermediates in the production of the aryl ketones [I] but also as therapeutic agents. These and other objects of the invention will be apparent to those skilled in the art from the foregoing and subsequent descriptions.

According to the present invention, the aryl ketones [I] and the intermediates as above mentioned can be produced as shown in the following scheme:

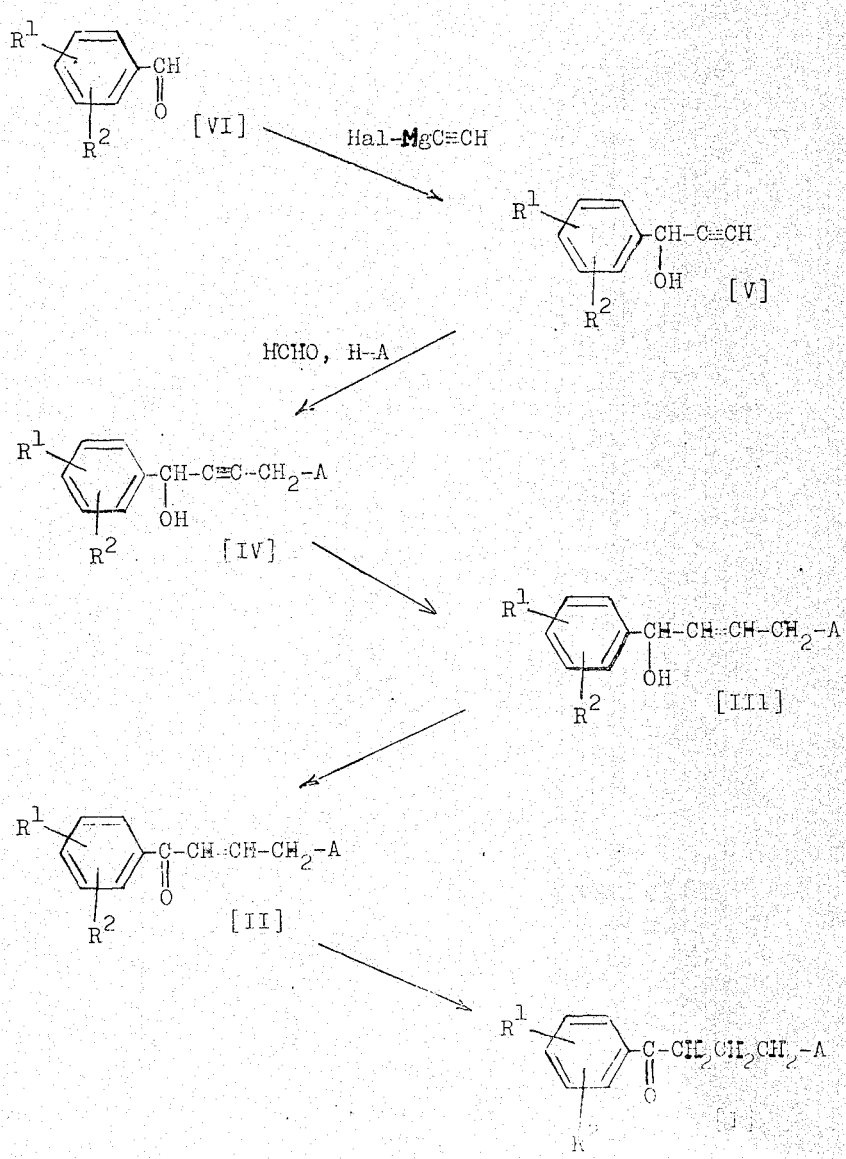

wherein Hal represents a halogen atom and $R^1$, $R^2$ and A are each as defined above.

The reactions in the foregoing scheme will be hereinafter illustrated step by step in details.

Firstly, the acetylenic aryl alcohol [IV] may be prepared by reacting the acetylenic alcohol [V] with an amine of the formula:

H—A wherein A is as defined above in the presence of formaldehyde.

The reaction is favorably carried out in the presence of a catalyst in an inert solvent around room temperature or below, or under reflux conditions. Examples of the solvent are water, methanol, ethanol, isopropanol, isoamyl alcohol, diethyl ether, tetrahydrofuran, dioxane, diethyleneglycol dimethyl ether, ethyleneglycol monomethyl ether, etc. As the catalyst, there are exemplified cupric chloride, cuprous chloride, cupric sulfate, cuprous acetate, ferric chloride, etc.

In the above reaction, the starting acetylenic alcohol [V] may be replaced by any obvious chemical equivalent such as a compound of the formula:

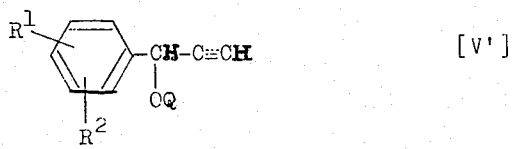

wherein Q is a conventional protective group for hydroxyl such as tetrahydropyranyl, t-butyl, benzyl, acetyl or benzoyl and $R^1$ and $R^2$ are each as defined above.

The said acetylenic alcohol [V] is obtainable by reacting the benzaldehyde [VI] with a Grignard reagent of the formula:

Hal—MgC≡CH wherein Hal is as defined above according to a conventional procedure.

The acetylenic aryl alcohol [IV] is then reduced to the olefinic aryl alcohol [III].

This reduction may be conducted by a conventional semihydrogenation techique. Thus, the semihydrogenation is conveniently carried out in an alcoholic solvent in the presence of a catalyst (e.g. Lindlar catalyst, palldium on barium sulfate deactivated with quinoline) around room temperature or below. When an equimolar amount of hydrogen is absorbed, the reaction is substantially completed, and the desired product is obtained in a good yield.

The said reduction may be also accomplished by reacting the acetylenic aryl alcohol [IV] with a reducing agent such as a metal hydride (e.g. lithium aluminum hydride, sodium borohydride) or the combination of an alkali metal and an amine (e.g. sodium in liquid ammonia, lithium in methylamine). The reaction using the metal hydride is ordinarily carried out in an inert solvent (e.g. diethylether, tetrahydrofuran, dioxane, ethyleneglycol dimethylether, benzene, toluene, hexane, cyclohexane) at a temperature from about 0°C to a refluxing temperature. The recovery of the desired product from the reaction mixture may be effected by a usual manner.

The olefinic aryl alcohol [III] thus obtained possesses a cis- or trans-olefinic double bond. One of the cis- and trans-isomers can be produced selectively by the choice of a suitable reduction procedure. For instance, the catalytic hydrogenation affords usually the cis-isomer and the reduction with a metal hydride gives ordinarily the trans-isomer.

The olefinic aryl alcohol [III] is then oxidized to the olefinic aryl ketone [II].

The oxidation may be carried out by treating the olefinic aryl alcohol [III] with an oxidizing agent (e.g. manganese dioxide, chromic acid, chromates, permanganates, oxygen, dimethylsulfoxide, peracids), usually in water or an organic solvent at room temperature or under cooling or gentle heating. The reaction product is readily separated from the reaction mixture by a conventional procedure.

The olefinic aryl ketone [II] as prepared above is hydrogenated to give the corresponding saturated aryl ketone [I].

The hydrogenation may be conducted by a conventional catalytic hydrogenation procedure and is conveniently effected in an alcoholic solvent in the presence of a catalyst (e.g. palladium, nickel) around room temperature under about 1 to 4 atmospheres.

All of the above prepared compounds, i.e. the aryl ketone [I], the olefinic aryl ketone [II], the olefinic aryl alcohol [III] and the acetylenic aryl alcohol [IV], have at least one basic nitrogen atom and can form acid-addition salts with ease. When desired, these acid-addition salts may be subjected as such to any of the reactions as mentioned above.

It is specifically intended to include pharmaceutically acceptable salts among the acid-addition salts. Such salts are formed by the reaction between any free base of the said compounds and an acid having a pharmaceutically acceptable anion. The term "pharmaceutically acceptable anion" has a definite meaning to those skilled in the art. It is defined as a non-toxic anion of any of the simple acids used therapeutically to neutralize basic medicinal agents when the salts thereof are to be utilized therapeutically. These acids include both inorganic and organic acids, for example, hydrochloric, hydrobromic, hydroiodic, sulfuric, succinic, phosphoric, maleic, tartaric, citric, glycolic and other acids.

The animal tests have revealed that the compounds of the invention have pharmacological activities. Particularly, the olefinic aryl ketones [II] and the olefinic aryl alcohols [III] show a variety of depressant actions on the central nervous system. Some of them are more effective on conditioned avoidance response in rats than chlorpromazine. They also possess potent anti-methamphetamine and anti-apomorphine effects. These compounds and the acetylenic aryl alcohols [IV] exhibit also beneficial pharmacological activities indicating the utility as analgesic, anti-inflammatory, autonomotropic and/or anti-fungal agents.

Each of these compounds may be brought into a form suitable for administration according to a method known per se. For the preparation of pharmaceutical compositions, they may be mixed with carriers, diluents, lubricants, fillers and/or binders such as lactose, sucrose, calcium phosphate, starch, talcum, casein, magnesium stearate, methyl cellulose, polyglycols, tragacanth and the like, sometimes together with stabilizers and emulsifying agents. The resulting mixture may be processed in a usual manner to tablets, capsules, pills, ampoules and the like. The usual oral dosage of the active ingredient is between about 0.1 mg and about 1000 mg daily.

Practical and presently preferred embodiments of the present invention are illustratively shown in the follow-

EXAMPLE 1

To a solution of 3-azabicyclo[3,2,2]nonane (1.50 g) in a mixture of dioxane (4 ml), water (2 ml) and 37 % formalin (1.3 g), there were added a solution of 3-(p-fluorophenyl)-3-hydroxy-1-propyne (1.5 g) in dioxane (4 ml) and a solution of cupric sulfate (pentahydrate) (80 mg) in water (2 ml) under ice-cooling. The resulting mixture was heated at 110°C for 30 seconds and, after cooling, poured into concentrated aqueous ammonia. The resulting mixture was extracted with ether. The ether extracts were chromatographed to afford N-[4-(p-fluorophenyl)-4-hydroxy-2-butynyl]-3-azabicyclo[3,2,2]nonane (2.9 g) as an oily liquid. $\nu_{OH}^{neat}$ 3300 cm$^{-1}$.

In the same manner as above, the following compounds were obtained:

1-[4-(p-Fluorophenyl)-4-hydroxy-2-butynyl]-4-(p-chlorophenyl)-4-hydroxypiperidine, m.p. 145° – 146.2°C.

1-[4-(p-Chlorophenyl)-4-hydroxy-2-butynyl]-4-(p-chlorophenyl)-4-hydroxypiperidine, $\nu_{OH}^{neat}$ 3350 cm$^{-1}$, $\nu_{C \equiv C}^{neat}$ 2250 cm$^{-1}$.

1-[4-(p-Fluorophenyl)-4-hydroxy-2-butynyl]-4-(o-methoxypheny)piperazine, $\nu_{OH}^{neat}$ 3300 cm$^{-1}$.

8-[4-(p-Fluorophenyl)-4-hydroxy-2-butynyl]-1-phenyl-1,3,8-triazaspiro[4,5]decan-4-one, $\nu_{OH}^{neat}$ or $\nu_{NH}^{neat}$ 3280 cm$^{-1}$, $\nu_{C=O}^{neat}$ 1705 cm$^{-1}$.

1-[4-(p-Fluorophenyl)-4-hydroxy-2-butynyl]-4-(2-keto-1-benzimidazolinyl)piperidine, $\nu_{OH}^{neat}$ or $\nu_{NH}^{neat}$ 3200 cm$^{-1}$, $\nu_{C=O}^{neat}$ 1680 cm$^{-1}$.

1-[4-(p-Fluorophenyl)-4-hydroxy-2-butynyl]-4-(m-trifluoromethylphenyl)-4-hydroxypiperidine, $\nu_{OH}^{neat}$ 3350 cm$^{-1}$.

N-[4-(p-Chlorophenyl)-4-hydroxy-2-butynyl]morpholine, $\nu_{OH}^{neat}$ 3350 cm$^{-1}$.

EXAMPLE 2

To an ethereal solution (10 ml) of lithium aluminum hydride (0.40 g) was added a solution of N-[4-(p-fluorophenyl)-4-hydroxy-2-butynyl]-3-azabicyclo[3,2,2]nonane (1.70 g) in ether (15 ml) under ice-cooling. After stirring at 10°C for 1.5 hours and further at 25°C for 1.5 hours, acetone was added thereto in order to consume excess of lithium aluminum hydride. The resulting mixture was poured into an aqueous ammonium chloride solution and extracted with ether. The ether extracts were washed with water, dried over anhydrous magnesium sulfate and concentrated to afford N-[4-(p-fluorophenyl)-4-hydroxy-2-butenyl]-3-azabicyclo[3,2,2,]nonane (1.65 g) as white needles. M.P. 102° – 106°C (from chloroform).

In the same manner as above, the following compounds were obtained:

N-[4-(p-Chlorophenyl)-4-hydroxy-2-butenyl]morpholine, $\nu_{OH}^{neat}$ 3350 cm$^{-1}$.

1-[4-(p-Fluorophenyl)-4-hydroxy-2-butenyl]-4-(p-chlorophenyl)-4-hydroxypiperidine, m.p. 149° – 151°C (from chloroform).

1-[4-(p-Fluorophenyl)-4-hydroxy-2-butenyl]-4-(o-methoxyphenyl)piperazine, m.p. 93° – 95°C.

1-[4-(p-Fluorophenyl)-4-hydroxy-2-butenyl]-4-(m-trifluoromethylphenyl)piperidine, $\nu_{C=C}^{neat}$ 1660 cm$^{-1}$.

EXAMPLE 3

A mixture of N-[4-(p-fluorophenyl)-4-hydroxy-2-butynyl]-3-azabicyclo[3,2,2]nonane (0.46 g) in methanol (13 ml) and platinum oxide (20 mg) was subjected to hydrogenation under atmospheric pressure at room temperature. After an equimolar amount of hydrogen was absorbed, the hydrogenation was stopped, and the mixture was filtered. The filtrate was concentrated in vacuum, and the residue obtained was chromatographed on silica gel to yield N-[4-(p-fluorophenyl)-4-hydroxy-2-butenyl]-3-azabicyclo[3,2,2]nonane as an oily liquid. $\nu_{OH}^{neat}$ 3350 cm$^{-1}$.

EXAMPLE 4

To a deactivated palladium catalyst, which was prepared from 5 % palladium on barium sulfate (20 mg) and quinoline (7 mg) in methanol (3 ml) by stirring for 15 minutes under hydrogen, was added a solution of 1-[4-(p-fluorophenyl)-4-hydroxy-2-butynyl]-4-(p-chlorophenyl)-4-hydroxypiperidine (0.60 g) in methanol (15 ml), and the resulting mixture was stirred under hydrogen at 25°C until an equimolar amount of hydrogen (38.5 ml) was consumed. The catalyst was filtered off, and the filtrate was concentrated in vacuum to afford 1-[4-(p-fluorophenyl)-4-hydroxy-2-butenyl]-4-(p-chlorophenyl)-4-hydroxypiperidine (0.60 g) as white prisms. M.P. 149° – 150°C (from methanol).

EXAMPLE 5

A mixture of N-[4-(p-fluorophenyl)-4-hydroxy-2-butenyl]-3-azabicyclo[3,2,2]nonane (1.15 g) in chloroform (70 ml) and manganese dioxide (10 g) was stirred at room temperature for 5 hours. Filtration of inorganic materials and concentration of the filtrate afforded N-[4-(p-fluorophenyl)-4-oxo-2-butenyl]-3-azabicyclo[3,2,2]nonane (0.8 g) as pale yellow needless. M.P. 51° – 51.5°C.

In the same manner as above, the following compounds were obtained:

N-[4-(p-Chlorophenyl)-4-oxo-2-butenyl]morpholine, $\nu_{C=O}^{neat}$ 1670 cm$^{-1}$, $\nu_{C=C}^{neat}$ 1620 cm$^{-1}$.

1-[4-(p-Fluorophenyl)-4-oxo-2-butenyl]-4-(p-chlorophenyl)-4-hydroxypiperidine, m.p. 111.5° – 113°C.

1-[4-(p-Fluorophenyl)-4-oxo-2-butenyl]-4-(o-methoxyphenyl)piperazine, m.p. 89.5° – 91.5°C.

EXAMPLE 6

A mixture of N-[4-(p-fluorophenyl)-4-oxo-2-butenyl]-3-azabicyclo[3,2,2]nonane (450 mg) and 5 % palladium on charcoal (25 mg) in toluene (20 ml) was stirred under hydrogen at 25°C until an equimolar amount of hydrogen was consumed. The catalyst was filtered off, and the filtrate was concentrated in vacuum to afford N-[4-(p-fluorophenyl)-4-oxobutyl]-3-azabicyclo[3,2,2]-nonane (440 mg) as an oily liquid. $\nu_{C=O}^{neat}$ 1690 cm$^{-1}$.

In the same manner as above, the following compounds were obtained:

1-[4-(p-Fluorophenyl)-4-oxobutyl]-4-(p-chlorophenyl)-4-hydroxypiperidine, m.p. 149° – 151°C.

1-[4-(p-Fluorophenyl)-4-oxobutyl]-4-(m-trifluoromethylphenyl)-4-hydroxypiperidine, m.p. 99° – 101°C.

1-[4-(p-Fluorophenyl)-4-oxobutyl]-4-phenylpiperazine, m.p. 105°C.

What is claimed is:
1. A compound of the formula:
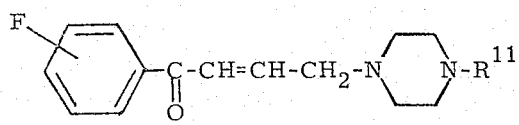
wherein $R^{11}$ is alkoxyphenyl in which the alkoxy group has 1 to 4 carbon atoms.
2. The compound of claim 1, wherein $R^{11}$ is o-methoxyphenyl.
3. The compound of claim 2 comprising 1-(4-(p-fluorophenyl)-4-oxo-2-butenyl)-4-(o-methoxyphenyl)-piperazine.
* * * * *

UNITED STATES PATENT OFFICE
CERTIFICATE OF CORRECTION

Patent No. 3,922,266      Dated November 25, 1975

Inventor(s) Junki KATSUBE, et al

It is certified that error appears in the above-identified patent and that said Letters Patent are hereby corrected as shown below:

On the title page, the seventh (7th) inventors name is spelled incorrectly.

Title page as the seventh (7th) inventor's name appears:

Shiegenari Katayama

Seventy (7th) inventor's name as it should appear:

Shigenari Katayama

Signed and Sealed this

*thirtieth* Day of *March 1976*

[SEAL]

Attest:

RUTH C. MASON
*Attesting Officer*

C. MARSHALL DANN
*Commissioner of Patents and Trademarks*